July 16, 1968  J. WERNER  3,392,488
ASSEMBLY FOR ADJUSTING THE POSITION OF AN ARTICLE
Filed Oct. 27, 1965  3 Sheets-Sheet 1
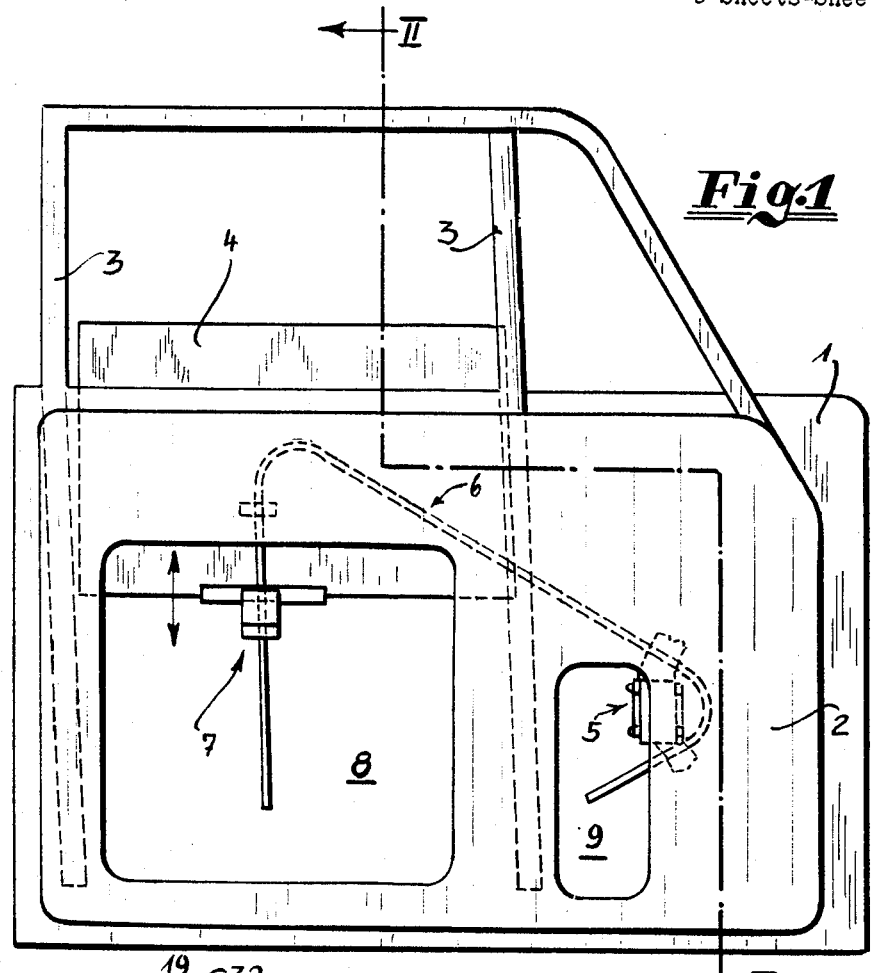
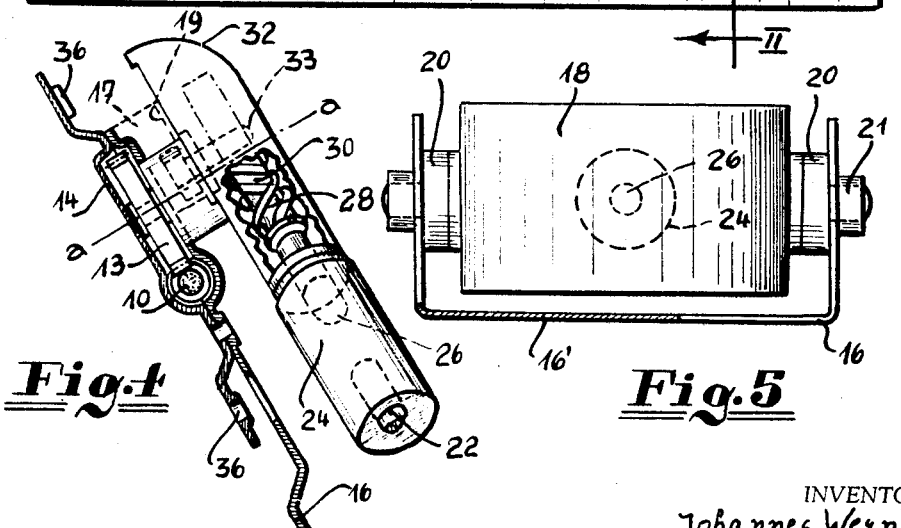
INVENTOR.
Johannes Werner
BY Nolte and Nolte
ATTORNEYS

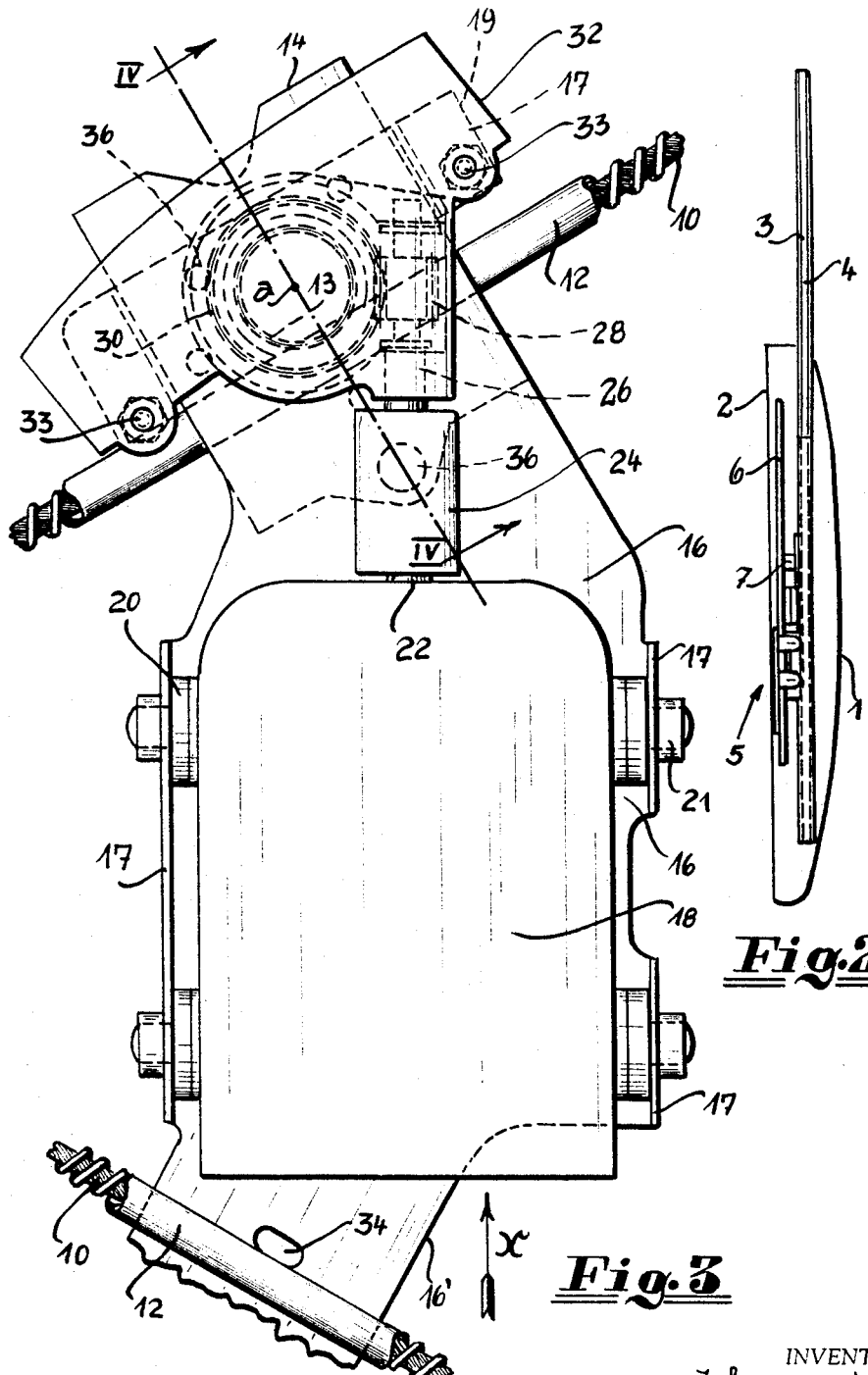

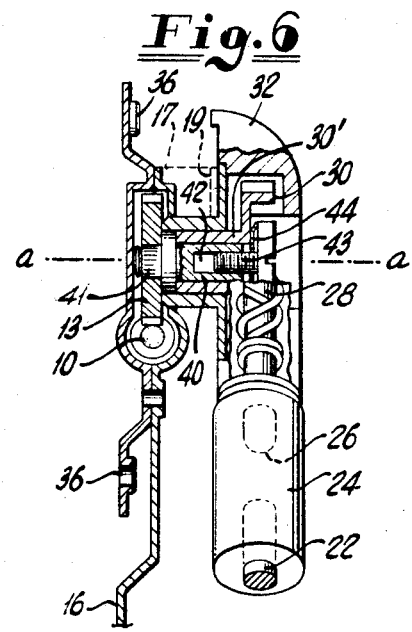

United States Patent Office 3,392,488
Patented July 16, 1968

3,392,488
ASSEMBLY FOR ADJUSTING THE POSITION OF AN ARTICLE
Johannes Werner, Offenbach am Main, Germany, assignor to H. T. Golde G.m.b.H. & Co. K.G., Frankfurt am Main, Germany
Filed Oct. 27, 1965, Ser. No. 505,379
Claims priority, application Germany, Nov. 3, 1964, G 41,928
3 Claims. (Cl. 49—349)

ABSTRACT OF THE DISCLOSURE

Compact remotely actuated window operating means are provided for an automotive vehicle. In the small space defined by two closely adjacent door panels an externally toothed elongated cable is secured at one end by suitable means to the bottom end of the window. Mounting plate means are secured to the inside surface of one door panel and a gear train, including a spur gear engaging the cable and a worm/worm wheel combination, are driven by a flat compact motor. All the components are contained within the door panels. Optionally a slip clutch can be provided for safety purposes and a flexible coupling can be utilized between the gear train and the drive motor.

---

The present invention relates to adjusting devices, in particular to devices designed to adjust the position of an article such as the window in an automobile door. The invention relates particularly to an assembly which is electrically driven and capable of raising and lowering the window in an automobile door.

Assemblies of this type generally include a structure connected to the lower edge of the window which is to be raised and lowered, this latter structure being connected with an elongated flexbile cable capable of moving longitudinally through the distance required to raise and lower the window and guided in a suitable tubular guiding structure which gives to the flexible cable the rigidity of stiffness which is necessary to transmit the longitudinal movement of the cable to the window. This cable can be longitudinally moved by way of a reversible electric motor whose motion is transmitted to the cable through a suitable step-down transmission.

It is a primary object of the invention to provide an electrically driven assembly of the above type which is extremely compact so that it will occupy a very small amount of space.

Furthermore, it is an object of the invention to provide an assembly of this type composed of standard elements enabling the same assembly to be used with different types of automobiles having different types of doors and windows.

Also, it is an object of the invention to provide an assembly of the above type which can be very quickly mounted on an automobile door or the like with a minimum amount of fastening devices required for this purpose.

In addition, it is an object of the invention to provide a drive which will operate with very little noise as well as in a very reliable manner.

A more particular object of the present invention is to provide a motor-driven assembly of the above type which can readily be exchanged for a hand-operated assembly providing the possibility of using the very same mounting structure either for the manually-operable or motor-driven assemblies.

The objects of the invention also include the provision of a structure of the above type wherein for mass production purposes the same components will to a large extent be used either for a manual crank-type of drive or for an automatic drive.

It is an object of the invention particularly to provide a structure where the very same mounting screws can be used either for the manual or the automatic assemblies.

Thus, with the structure of the invention certain fittings will be used both with the automatic and the manual assemblies, and the structure meets all of the requirements of an assembly which is not limited to one single type of construction and which is very easy to mount while providing an entirely reliable automatic drive. The structure includes, for the purposes of safety, a suitable slip clutch in the transmission between the motor and the window so that this slip clutch can in a known way prevent injury either to a person operating the window, such as a child whose hand is in the path of movement of the window, or to the assembly itself as a result of the capability of slippage in the transmission produced by the presence of the slip clutch therein. Thus, with the structure of the invention it is possible to incorporate safety devices of this type to guarantee that when the window encounters resistance to its movement, the structure will yield and will not provide a positive drive which could result in possible injury.

In particular, the objects of the present invention include the provision of an exceedingly simple structure which is particularly economical to manufacture and which will provide a fully adequate assembly for all of the purposes referred to above.

The invention is illustrated by way of example in the accompanying drawings which form part of the application and in which:

FIG. 1 is a schematic side elevation of the door of an automobile as seen from the interior of the automobile and having the window-adjusting structure of the invention built in;

FIG. 2 is a schematic section of the structure of FIG. 1, taken along lines II—II of FIG. 1 in the direction of the arrows;

FIG. 3 shows the assembly of the invention on an enlarged scale as compared to FIGS. 1 and 2, and as the assembly appears when looking toward the assembly from the exterior of the door of the vehicle;

FIG. 4 is a fragmentary section of the structure of FIG. 3 taken along line IV—IV of FIG. 3 in the direction of the arrows;

FIG. 5 is an end elevation of the structure of FIG. 3 as seen in the direction of the arrow X of FIG. 3; and FIG. 6 is a view similar to FIG. 4 with additional portions broken away to illustrate the slip clutch.

Referring to FIGS. 1 and 2 of the drawings, there is illustrated therein an automobile door having an outer sheet metal wall 1 and an inner sheet metal wall 2 which defines with the wall 1 a space for accommodating structure for opening and closing a window carried by the door. For this purpose the door includes substantially upright guides 3 for engaging the front and rear edges of the window 4 so as to guide the latter for vertical movement.

FIGS. 1 and 2 also illustrate the structure for adjusting the window 4 so as to raise and lower the latter, and this latter structure includes three primary assembles, namely a drive assembly 5, a transmission assembly 6 in the form of a flexible cable which is suitably guided, and finally a fitting assembly 7 which serves to connect the cable to the lower edge of the window 4.

The inner wall 2 of the door is in a known way provided at suitable locations with cutouts 8 and 9 which serve to reduce the weight and to facilitate the assembly of the parts. Inasmuch as the drive transmission 6 can be mounted so as to extend along any desired path, the mounting of the drive assembly 5 relative to the window 4 can be chosen so as to have practically any desired location on the door with respect to the window. Therefore, as a result of the wide choice in the locations of the drive assembly 5, resulting from the flexible nature of the transmission cable of the transmission 6, it is possible to use this structure for any type of automobile inasmuch as, irespective of the type of automobile, the inner wall 2 of the door thereof will provide a suitable location for the drive assembly 5. This location will in general be one which permits a crank drive to be comfortably located within reach of the operator of the vehicle, and also the location of the components will be adapted to the particular requirements afforded by the available interior space of the door. The components 1–4 and 6–7 referred to above are in general well known and have nothing to do with the invention. The invention relates primarily to an especially advantageous construction of the drive assembly 5 and is described in greater detail below in connection with FIGS. 3–5.

The drive assembly 5, which is shown on an enlarged scale in FIG. 3, is illustrated in connection with part of the transmission 6. This transmission 6 includes in a known way a flexible cable 10 having a toothed exterior. This toothed exterior of the flexible cable 10 is formed by a wire or the like which is helically wound around and fixed to the exterior of the cable 10. The cable 10 is guided by a guide means which gives to this cable the stiffness required for transmission of longitudinal movement of the cable to the window. This guide means takes the form of an elongated tube 12 in which the flexible cable 10 is longitudinally movable. The helical wire or the like at the exterior of the cable forming the teeth thereof is in mesh with the inclined teeth of a driving gear 13 which is supported for rotary movement by a bearing plate means 14. This bearing plate means 14 is in the form of a simple plate having the configuration clearly apparent from FIGS. 3 and 4 and is mounted on the wall 2 by way of suitable fasteners which engage in the openings 36 of the bearing plate 14. This bearing plate carries a suitable pin on which the gear 13 is mounted for rotary movement.

A support plate means 16 is connected with the bearing plate 14, and this support plate 16 covers part of the drive gear 13 as well as part of the guide 12 for the cable 10, so as to form with the bearing plate 14 a housing for the gear 13 as well as to partly envelop, together with the plate 14, the tubular guide 12 for the cable 10. Of course, at the region of the gear 13 the tubular guide 12 is formed with a suitable slot through which the gear 13 has free access to the teeth at the exterior of the cable 10.

The support plate means 16 is provide with a substantial extension which extends beyond the bearing plate 14 in a downward direction, as viewed in the drawings, and it is this extension of the support plate 16 which serves to carry a relatively thin or flat electric motor 18 of approximately rectangular cross section. For this purpose the support plate 16, which is generally flat and generally parallel to the bearing plate 14, is provided with arms 17 bent substantially perpendicularly from the remaining flat portion of the support plate 16 and carrying elastic supports 20 which are fixed to the arms 17 by suitable screws 21 and which serve to directly support the motor 18. These resiliently yieldable cushions 20 serve to insulate any vibrations of the motor 18 so that these vibrations will not be transmitted to the support plate 16. Moreover, the arms 17 support the motor 18 at such an elevation or distance from the plate 16 that during operation of the motor 18 it is maintained spaced from the primary flat portion or plate in which the support plate 16 is located, and during its operation the motor 18 is exclusively supported by the elastic structure 20.

The drive shaft 22 of the motor is operatively connected with a shaft 26, preferably through an elastic coupling 24, and it is this shaft 26 which is fixed to a rotary worm 28. According to the embodiment shown the elastic coupling 24 consists of a cylindrical body made of rubber to which the respective ends of the rotary worm 28 and the shaft 22, respectively, are operatively or rigidly connected.

The worm 28 meshes with a worm wheel 30 which is coaxial with the drive gear 13 and rotates about an axis a—a which coincides with the axis of the drive gear 13. However, the worm wheel 30 is not directly connected with the drive gear 13. Instead, it is connected thereto through a suitable slip clutch which, for example, can take the form, in a known way, of cup springs in the forms of dished springy plates which frictionally press against each other with a spring pressure which is preferably adjusted so that while the required torque can be transmitted through the clutch nevertheless it will slip when the window 4 encounters a resistance, as pointed out above.

As may be seen in FIG. 6, shaft 40 rigidly supports gear 13 at end 41 thereof. The hollow shank 30' of worm wheel 30 is positioned on shaft 40 which is also formed with a tapped hole 42 at the end thereof opposite to end 41. A screw is threadably engaged in tapped hole 42 to retain the worm wheel. A cup spring 44 is located beneath the head of screw 43 to resiliently bear against an end face of worm wheel 30. Thus should there be some resistance that prevents rotation of drive gear 13, the hollow shank 30' will slip on shaft 40 while worm 28 drives worm wheel 30. Under normal conditions, when there is no resistance to the rotation of gear 13, the force exerted by spring cup 44 will make gear 13 and worm wheel 30 a unitary structure that is rotated as such by worm 28.

The worm drive 28, 30 is situated within a housing 32 which is connected to further arms 17 bent from the remainder of the support plate 16. These latter arms 17 have, however, angularly extending end flanges 19 on which the housing 32 is mounted, and through these flanges 19 pass screws 33 which serve to fix the housing 32 rigidly with the support plate 16 and through the latter with the bearing plate 14. The support plate 16 may be fixed to the bearing plate 14 as by being welded thereto or as by being fastened thereto through suitable fasteners such as bolts and nuts, or the like.

As is particularly apparent from FIG. 3, the support plate 16 has a portion 16' extending beyond that portion thereof which carries the motor 18 and formed with a bore 34 capable of receiving a spacer of relatively soft material, such as rubber or the like, and adapted to be situated between the inner door wall 2 and the outer door wall 1. However, instead of a spacer of this type it is also possible to provide a screw for further fastening of the plate 16 to the inner door wall 2.

The angular configuration of the primary substantially flat portion of the support plate 16, as illustrated in the drawing, can in special cases be changed to correspond to a particular type of automobile, without requiring for this purpose a change in the drive as a result of the change in the location of the motor 18 with respect to the axis a—a. The only change resides in this case in the angular relationship of the engagement between the worm 28 and the worm wheel 30.

In order to mount the drive assembly 5 (FIG. 1) on the vehicle door, in particular on the inner wall 2 thereof, a relatively small number of fastening screws suffice, such as for example, those required to cooperate with the openings 36 at the locations of these openings illustrated in FIGS. 3 and 4. As is apparent from FIGS. 3 and 4, these openings 36 are situated in the immediate vicinity of the drive gear 13 at the region where fastenings are also required when only a manual crank drive is provided for moving the window, while the entire electrical drive and transmission is carried by the support plate means 16 which is carried exclusively by the bearing plate 14 and extends freely therefrom so that no structure is required to connect the support plate 16 to the vehicle and instead only the bearing plate 14 requires a connection to a part of the vehicle.

As is particularly apparent from FIGS. 1 and 3, the extension 16' of the motor-supporting plate 16 serves simultaneously as a holder for part of the tubular guide 12 for the flexible cable, so that in this way the free end of the cable can always be reliably maintained at a certain distance from the inner wall of the door without requiring any special mounting for this purpose.

What is claimed is:

1. In a window operating device used between closely spaced panels of an automotive vehicle, the device including an elongated, externally toothed cable secured at one end to the bottom of the window, improved cable drive-means, said improvement comprising:
   (a) a support plate secured to the inside surface of one of the panels;
   (b) first gear means rotatably mounted on said first plate and in meshing, driving emgagement with the cable;
   (c) a support member;
   (d) second gear means rotatably disposed in said support member and drivingly coupled in said first gear means;
   (e) clutch means interposed between said first and said second gear means; and
   (f) means drivingly coupled to said second gear means,
   (g) said support plate, said first and second gear means, said support member, said clutch means and said last mentioned means all being disposed in the space between the panels.

2. In a window operating device used between closely spaced panels of an automotive vehicle, the device including an elongated, externally toothed cable secured at one end to the bottom of the window, improved cable drive-means, said improvement comprising:
   (a) a first support plate secured to the inside surface of one of the panels;
   (b) a second support plate secured to said first support plate;
   (c) first gear means rotatably mounted on said first plate and in meshing, driving engagement with the cable;
   (d) a support member secured to and spaced from said second support plate;
   (e) second gear means rotatably disposed in said support member and drivingly coupled to said first gear means; and
   (f) means drivingly coupled to said second gear means;
   (g) said first and second support plates, said first and second gear means, said support member and said last mentioned means all being disposed in the space between the panels.

3. In a window operating device used between closely spaced panels of an automotive vehicle, the device including an elongated, externally toothed cable secured at one end to the bottom of the window, improved cable drive-means, said improvement comprising:
   (a) a support plate secured to the inside surface of one of the panels;
   (b) first gear means rotatably mounted on said support plate and in meshing, driving engagement with the cable;
   (c) a housing;
   (d) second gear means rotatably disposed in said housing and drivingly coupled to said first gear means; and
   (e) means drivingly coupled to said second gear means,
   (f) said support plate, said first and second gear means, said housing and said last mentioned means all being disposed in the space between the panels.

References Cited

UNITED STATES PATENTS

| 3,174,742 | 3/1965 | Stelzer | 49—349 |
| 1,157,921 | 10/1915 | Banks | 64—11 |
| 2,599,292 | 6/1952 | Steinbach et al. | 64—30 |
| 3,135,130 | 6/1964 | Bentley | 74—501 X |
| 3,248,970 | 5/1966 | Pickles | 74—422 X |

MILTON KAUFMAN, *Primary Examiner.*